(No Model.)

J. P. RUMMEL.
SUSPENDER ATTACHMENT.

No. 408,538. Patented Aug. 6, 1889.

Witnesses:
Percy C. Bowen
Wm. P. Moore

Inventor:
Joseph P. Rummel,
By Thos. E. Barrow
Attorney.

UNITED STATES PATENT OFFICE.

JOSEPH P. RUMMEL, OF MANSFIELD, OHIO.

SUSPENDER ATTACHMENT.

SPECIFICATION forming part of Letters Patent No. 408,538, dated August 6, 1889.

Application filed April 2, 1889. Serial No. 305,722. (No model.)

*To all whom it may concern:*

Be it known that I, JOSEPH P. RUMMEL, a citizen of the United States, residing at Mansfield, in the county of Richland and State of Ohio, have invented certain new and useful Improvements in Suspender Attachments; and I do declare the following to be a full, clear, and exact description of the invention, such as will enable others skilled in the art to which it appertains to make and use the same.

My invention relates to improvements in suspenders, and has especial reference to what is known as the "end attachment."

The leading object of the invention is the provision of an end attachment which will allow the ready and easy movement of the wearer of the suspenders without undue strain or wear on the suspenders.

A further object is the provision of an end attachment which will securely hold the braids in place.

A further object is the provision of an end attachment which will be ornamental in appearance, durable and inexpensive.

To attain the desired objects, the invention consists in the details of construction, combination, and adaptation of parts of a suspender attachment, substantially as illustrated, described, and claimed herein.

Figure 1:
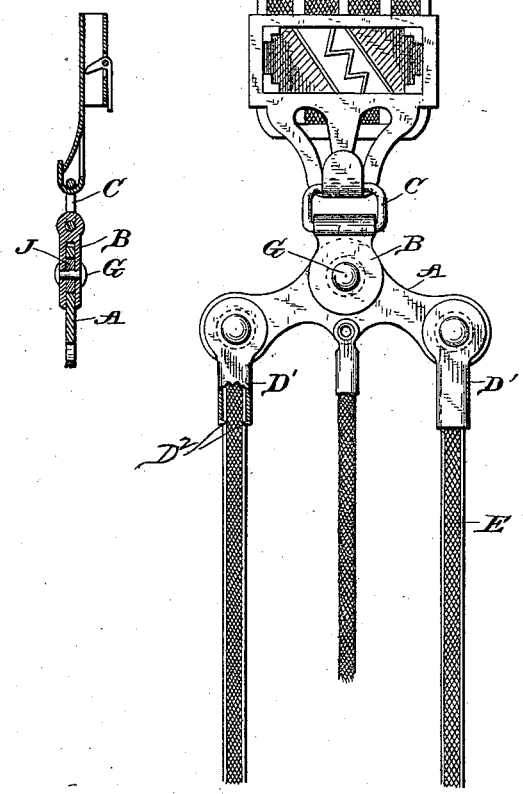
Figure 2:
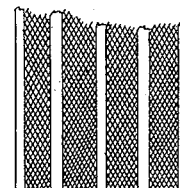
Figure 3:
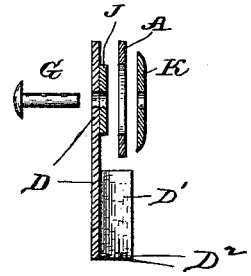

Figure 1 represents a front or face view of an end attachment embodying my invention. Fig. 2 represents a vertical section through the ring-clip and plate. Fig. 3 represents a vertical section through one of the braid-clamps and plate.

Referring by letter to the drawings, A designates a plate or bar which is provided with a central opening and end openings, and in said openings are received disks J, formed with openings to receive pivot-pins, as will appear. By reason of the disks fitting in the openings a metallic bearing is provided, which rotates or moves with ease in said openings.

B designates the ring-clip, to which is connected the attaching-ring C, and the pivot-pin G of the ring-clip passes through the disk J.

D designates the braid-clamps formed with the depending casing or box D', having the barbs $D^2$, adapted to engage and secure the braids E, and in the end openings of the plate A are also placed disks J, through which the pivot-pins G of the braid-clamps pass, and the pivot-pin is retained in place by the braid-clamps on one side and the disks K on the opposite side, as clearly shown in Fig. 3.

From the foregoing it will be seen that the braid-clamps are allowed to move to greater angles than heretofore without strain or binding, and also that the bearing is one which will permit easy movement.

I claim—

A suspender attachment consisting of the plate having the enlarged central and end openings, the disks arranged in said openings, the ring-clamp pivoted to the central disk, the braid-clamps pivoted to the end disks and having depending casings provided with barbs for engaging the braid and securing the same, and the disks connected to the pivots of the braid-clamps for securing them in position, substantially as and for the purpose described.

In testimony whereof I affix my signature in the presence of two witnesses.

JOSEPH P. RUMMEL.

Witnesses:
 JESSE E. LA DOW,
 WM. RITTER.